United States Patent [19]

Kelly et al.

[11] Patent Number: 4,505,405
[45] Date of Patent: Mar. 19, 1985

[54] PROPORTIONAL PUMPING SYSTEM

[75] Inventors: Lawrence S. Kelly, Bolingbrook; Dean L. Schaffran, Carol Stream; Donald S. Nii, Arlington Heights, all of Ill.

[73] Assignee: Graco Inc., Minneapolis, Minn.

[21] Appl. No.: 171,968

[22] Filed: Jul. 24, 1980

[51] Int. Cl.³ .................. F04B 23/06; F04B 13/02; F04B 17/00
[52] U.S. Cl. .................. 222/135; 222/334; 417/390
[58] Field of Search ............ 222/129, 135, 136, 137, 222/334, 255, 256, 260, 261, 262, 263; 137/99; 417/339, 390

[56] References Cited

U.S. PATENT DOCUMENTS

| 2,946,488 | 7/1960 | Kraft | 222/134 |
| 3,610,783 | 10/1971 | Croucher | 417/390 |
| 4,312,463 | 1/1982 | Daby | 222/135 X |
| 4,317,647 | 3/1982 | Hauser | 417/390 X |

Primary Examiner—Joseph J. Rolla
Assistant Examiner—Frederick R. Handren
Attorney, Agent, or Firm—Paul L. Sjoquist

[57] ABSTRACT

A system for pumping liquid materials with reciprocating pumps driven by hydraulically operated motors, wherein the pressurized hydraulic oil which is used to drive the hydraulic motors is supplied via reciprocating proportioners. The reciprocating proportioners are driven by a reciprocating air motor operated under predetermined air pressure. The system operation is characterized in that, under blocked output pressure conditions, the air motor will inherently stall and thereby limit the pressure of the hydraulic oil acting to drive the hydraulic motors, which therefore limits the pumping pressure applied to the reciprocating pumps, and limits the output pressure of the pumped liquid materials.

5 Claims, 1 Drawing Figure

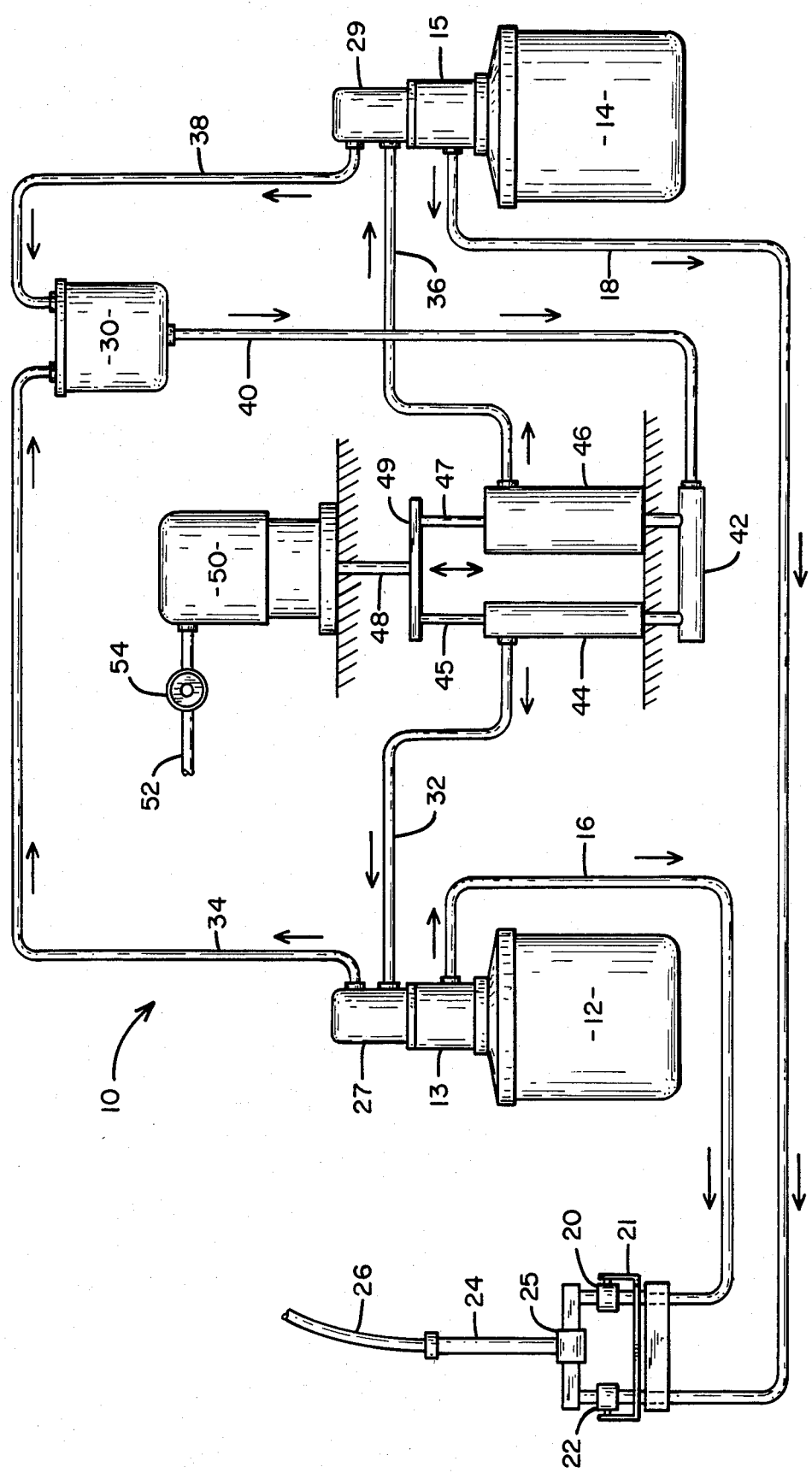

PROPORTIONAL PUMPING SYSTEM

BACKGROUND OF THE INVENTION

This invention relates to a system and apparatus for pumping liquids according to a predetermined volumetric ratio, and particularly to a system for the pumping of viscous liquids at predetermined fluid flow ratios.

The pumping of liquids according to predetermined and relatively precise ratios has long been a requirement in industry, particularly in fields where two or more liquid components are blended according to predetermined ratio requirements, such as might be the case in the proper mixing of a paint colorant component with a paint base material. In recent years the popularity of epoxies and other materials having an active catalyst component and a base component, each of which is inert when separate but highly reactive when mixed together, has imposed new requirements on proportioning systems. Such materials require careful separation of the individual components to avoid premature curing and other adverse effects prior to the time when they are to be used. Such components are typically completely separately handled by physically separate and individual pumping systems and are delivered to a common delivery point where they are practically simultaneously mixed together and applied to the finished product. Fast curing times require fast application of the mixed material, and the reactive nature of the mixed material requires transfer of the individual components in separate form to as near the point of application as possible.

A common approach to the proportioning of such liquids has been by the use of metering cylinders sized to the proper ratio requirements, and by common coupling the pistons in such metering cylinders to a single drive source, wherein reciprocation of the drive source causes identical reciprocation of the respective metering pistons, the ultimate liquid ratio being delivered thereby being dependent upon difference in internal volume of the metering cylinders.

Another approach to proportional metering utilizing a single drive source is disclosed in U.S. Pat. No. 3,967,634, issued July 6, 1976 and owned by the assignee of the present invention. This patent discloses a reciprocating drive motor coupled to a plurality of metering cylinders through variable lever arms, wherein the stroke of the drive source causes a measured and predetermined stroke of each of the metering cylinders thereby providing different volumetric flow rates depending upon stroke adjustment.

Another approach to metering liquids is disclosed in U.S. Pat. No. 3,107,034, issued Oct. 15, 1963, wherein reciprocating hydraulic pumps are driven by pressurized hydraulic oil provided by an electric motor and pump combination. The pressurized hydraulic oil is selectively valved into each of the hydraulic pumps, thereby controlling the speed of reciprocation of the respective pumps and consequently controlling the rate of flow of the pumped material. Such a system requires the use of bypass valves and other safeguards to prevent burnout of the electric drive motor under conditions wherein the pumps are in a "stalled" delivery mode, such as where back pressure develops in the flow lines, which back pressure is developed all the way back to the electric drive motor, which inherently attempts to provide hydraulic oil at a predetermined flow rate.

U.S. Pat. Nos. 4,019,652 and 4,170,319 issued Apr. 26, 1977 and Oct. 9, 1979 respectively, disclose fluid ratio delivery system utilizing pressurized accumulators for storing the respective fluid components, and appropriate valving into a common mixing chamber wherein the characteristics of the fluid components, the size of the input ports to the mixing chamber, and the predetermined fluid pressures are all selected so that the ratio of the flow rates by weight of the liquids at the input ports is constant. Such a system may be utilized for mixing a shot or small predetermined volume of at least two fluid components on an intermittent basis.

In any liquid proportioning and pumping system wherein reactive material components are mixed and applied, it is desirable to maintain physical separation between individual components prior to mixing. Further, in any system wherein such components are intermittently applied, as by way of a paint spray gun, it is necessary that the system accommodate the "blocked pressure" condition wherein the spray gun or applicator is shut off. In this situation back pressure is developed within the system which must be relieved or compensated for so that the motive driving force does not become damaged under a "stall" condition. Obviously, when electric motors or other similar motive drive forces are used, electrical disconnecting circuits must be provided to shut off the motor under "stall" conditions. Since air-operated drive motors have inherent ability to operate under "stall" conditions it is desirable to use such motors in applications of this type where possible.

SUMMARY OF THE INVENTION

The invention includes two or more reciprocable pumps for pumping respective liquid components, the pumps being mechanically driven by hydraulic reciprocating motors; the hydraulic motors are driven by pressurized hydraulic oil provided from respective metering cylinders, which cylinders are driven by common connection to a reciprocating air motor. Air pressure applied to the air motor causes the hydraulic metering cylinders to develop a predetermined flow rate of hydraulic oil to the hydraulic motors; the flow rate being determined by the relative size ratios of the metering cylinders, and the rate of reciprocation of the hydraulic motors being determined by the flow rate of hydraulic oil applied thereto. The respective liquid components pumped by the system will therefore be delivered according to the same ratio as the metering cylinders utilized to drive the hydraulic motors.

It is therefore a principal object of the present invention to provide a system for regulating the pumping rate of two or more pumps by means of regulating the ratio flow rate of the respective pump driving liquid.

It is another object of the present invention to provide a ratio-control liquid pumping system having the inherent capability of operating under "stall" conditions.

It is a further object of the present invention to provide a proportioning system wherein the proportioned liquid components may be maintained at a physical separation with respect to one another.

BRIEF DESCRIPTION OF THE DRAWING

The foregoing and other objects will become apparent from the appended specification, and with reference to the attached drawing in which a symbolic and schematic diagram of the invention is shown.

DESCRIPTION OF THE PREFERRED EMBODIMENT

Referring to the drawing, there is shown in symbolic and schematic form a pumping system 10 which embodies the features of the present invention. A first container 12 holds a viscous material such as a first paint component, and a second container 14 holds a second material such as a second paint component. A reciprocable pump 13 is immersed into the liquid within container 12, and pump 13 may be operated to pump the liquid through outlet pipe 16 in the direction shown by the arrows. Similarly, a reciprocable pump 15 is immersed in the liquid held by container 14 and pump 15 may be operated to pump the liquid through outlet pipe 18 in the direction of the arrows. The liquid in pipe 16 is conveyed through a valve 20 to a manifold 25, and the liquid in pipe 18 is conveyed through a valve 22 to manifold 25. Valves 20 and 22 may be simultaneously operated by means of lever 21 so as to simultaneously fill manifold 25 with liquid components from outlet pipes 16 and 18. A mixer 24 is connected downstream of manifold 25, and is constructed in a manner to thoroughly mix the liquid components as they flow through the mixer. A hose 26 is connected to the outlet of mixer 24 to convey the mixed liquids to a delivery device or applicator such as a spray gun (not shown).

Pump 13 is driven by a reciprocable hydraulic motor 27, which receives pressurized hydraulic oil through intake line 32 and exhausts hydraulic oil through exhaust line 34 in the directions of the arrows as shown. Similarly, pump 15 is operated by means of a reciprocable hydraulic motor 29, receiving pressurized hydraulic oil input via intake line 36 and exhausting hydraulic oil through exhaust line 38 in the directions shown by the arrows. The hydraulic motor/pump assemblies are commercially obtainable components, as for example hydraulic motors 27 and 29 may be the "Viscount" model manufactured by the assignee of the present invention under Part No. 208-270. Likewise, pumps 13 and 15 may be a type manufactured by the assignee of the present invention as Part No. 946-203, which in combination with the aforementioned hydraulic motor develops a pumping pressure to inlet oil pressure amplification of 1.79:1.

An oil reservoir 30 receives the exhaust oil from pipes 34 and 38, and provides a supply of oil for feed pipe 40. Feed pipe 40 is connected to a manifold 42 which has inlet connections to metering cylinders 44 and 46. A reciprocable piston within cylinder 44 is connected to rod 45; a reciprocable piston within cylinder 46 is connected to rod 47. Rods 45 and 47 are connected to shaft 48 by means of arm 49. Shaft 48 forms a part of air motor 50, which is reciprocable upon application of air pressure via inlet air line 52. A regulator 54 may be used to provide controllable inlet air pressure. Air motor 50 has an air exhaust (not shown) and an internal valving system which permits air pressure to reciprocate shaft 48. Air motor 50 is a commercially obtainable device, such as the "Hydra-Cat" model manufactured by the assignee of the present invention under Part No. 208-851. Metering cylinders 44 and 46 are also commercially available, and may be selected to provide the desired pumping ratios from pumps 13 and 15. For example, if the ratio of liquid to be pumped from pumps 13 and 15 is 1:2, cylinder 44 is chosen to have an internal cross-sectional area equal to $\frac{1}{2}$ the cross-sectional area of cylinder 46. Of course, further control and variation of the ratios of liquid pumped by pumps 13 and 15 may be had by varying the respective sizes of pumps 13 and 15 in addition to varying the sizes of metering cylinders 44 and 46. For example if pump 13 is chosen to have a pumping capacity flow rate of $\frac{1}{3}$ the capacity of pump 15, and metering cylinders 44 and 46 are further selected in the ratio of 1:2, the material delivered via outlet pipes 16 and 18 will flow in the ratio 1:6.

Container 12, with its associated pump and drive motor, may be remotely located from container 14, its associated pump and drive motor, and also from air motor 50 and its associated equipment. This is possible because the only lines interconnecting the respective components are pressurized hydraulic oil lines, which may be extended over considerable distances. Likewise, air motor 50 and its associated equipment may be physically separated from either or both pumps 13 and 15, as well as from the application hardware consisting of valves 20, 22, manifold 25 and mixer 24.

In operation, air pressure is applied to air motor 50 to cause it to begin reciprocation, thereby reciprocating rods 45 and 47 in metering cylinders 44 and 46. During the upstroke of rods 45 and 47 hydraulic oil is drawn into metering cylinders 44 and 46 via intake manifold 42, and is also pumped outwardly via pipes 32 and 36. During the downstroke of rods 45 and 47 the oil previously admitted into cylinders 44 and 46 is pumped outwardly via pipes 32 and 36. Thus, a continuous supply of pressurized hydraulic oil is provided via pipes 32 and 36, the volume flow rate being dependent upon the volumetric pumping capacities of the respective metering cylinders. The pressurized hydraulic oil pumped to the respective hydraulic motors 27 and 29 causes reciprocation thereof, and mechanical interconnection with pumps 13 and 15 causes a corresponding reciprocation in the pumps. Pumps 13 and 15 are designed to deliver liquid through lines 16 and 18 during both the upstroke and downstroke portion of their respective cycles, and thereby a continuous supply of liquid is provided to manifold 25 when valves 20 and 22 are opened. The liquid in manifold 25 passes into mixer 24 and becomes thoroughly mixed, and then passes through hose 26 to the applicator device, which may be a spray gun.

In the event valves 20 and 22 are turned off, or in the event the applicator itself is turned off, a liquid back pressure immediately develops in line 16 and 18. This back pressure is sensed by the respective hydraulic motors which develop corresponding back pressures in their inlet lines 32 and 36. The build-up of pressure in lines 32 and 36 is passed back into the metering cylinders 44 and 46, resulting in a back pressure to resist the reciprocating driving force of rods 45 and 47. When this back pressure builds up to a value sufficient to balance the applied air pressure at inlet 52, air motor 50 stalls and ceases its reciprocating action. It will remain in this condition until pressure at the outlet is again relieved, at which time air motor again begins its reciprocating action. The stalled condition of air motor 50 merely indicates a balancing of pressure forces across the air motor drive piston, and requires no special safeguards to protect against damage of the air motor in this condition.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A system and apparatus for pumping liquids according to predetermined ratios from at least two liquid reservoirs to a common distribution point, comprising
   (a) a reciprocable pump in each liquid reservoir;
   (b) a hydraulically reciprocable motor connected to each pump, said motor having ports for intake and exhaust of hydraulic oil;
   (c) an oil collection reservoir connected to all of said hydraulic oil exhaust ports;
   (d) a plurality of metering and pumping cylinders, one for each hydraulically reciprocable motor, said cylinders being respectively sized according to predetermined volume ratios and each having a liquid inlet and a liquid outlet, all of said liquid inlets commonly coupled to said oil collection reservoir and each of said liquid outlets respectively connected to a different hydraulic motor intake port;
   (e) a reciprocable air-operated motor having a drive member connected in common driving relationship to all of said metering and pumping cylinders; and
   (f) means for delivering liquid from respective pumps in said liquid reservoirs to a common distribution point.

2. The apparatus of claim 1, wherein said means for delivering liquid further comprises a plurality of hoses, each having an end connected to a respective reciprocable pump and all having a second end connected to a common manifold.

3. The apparatus of claim 2, further comprising a mixer connected to said common manifold.

4. A liquid pumping and proportioning system for delivering predetermined ratios by volume of several components, comprising
   (a) a reciprocable pump in liquid flow coupling with each of said liquid components;
   (b) means for delivering liquid from each of said reciprocable pumps to a common destination point;
   (c) a hydraulic drive motor connected to each of said reciprocable pumps;
   (d) a hydraulic oil pumping and delivery cylinder coupled to each of said hydraulic drive motors, said cylinders being respectively sized according to predetermined volume ratios;
   (e) a reservoir of hydraulic oil coupled to all of said hydraulic oil pumping and delivery cylinders, and including hydraulic oil exhaust pipes connected between said reservoir and each of hydraulic drive motors; and
   (f) an air drive motor having a reciprocable drive member connected in driving relationship to all of said pumping and delivery cylinders.

5. The system of claim 4, wherein said common destination point further comprises a liquid flow manifold and liquid mixer assembly.

* * * * *